Feb. 12, 1963 H. S. PHILBRICK, JR 3,077,010
GAS STERILIZER APPARATUS
Filed Aug. 4, 1960
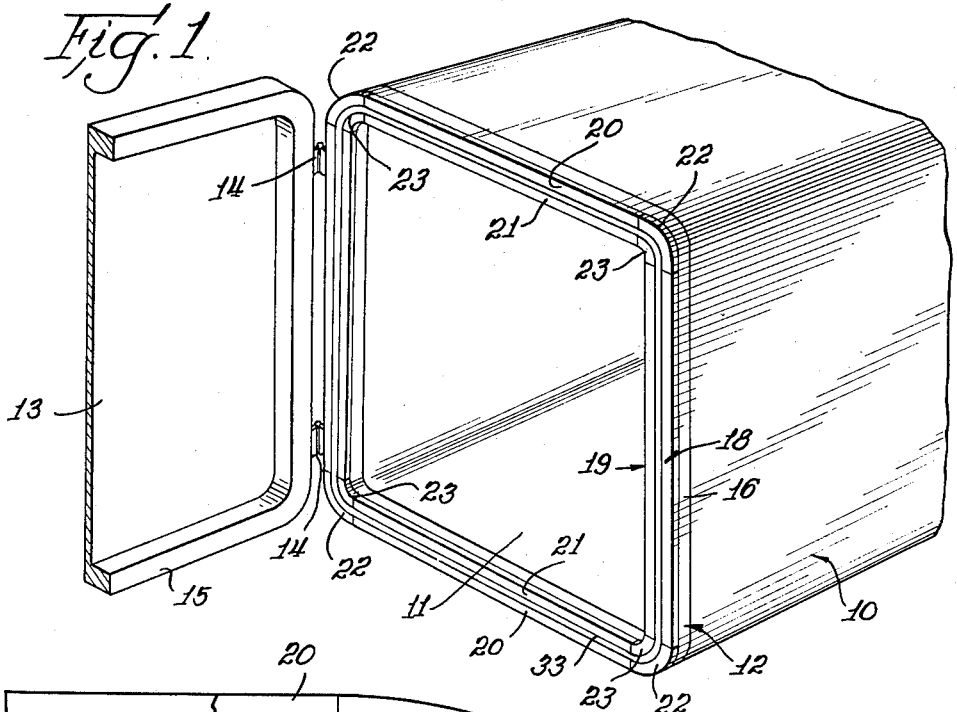
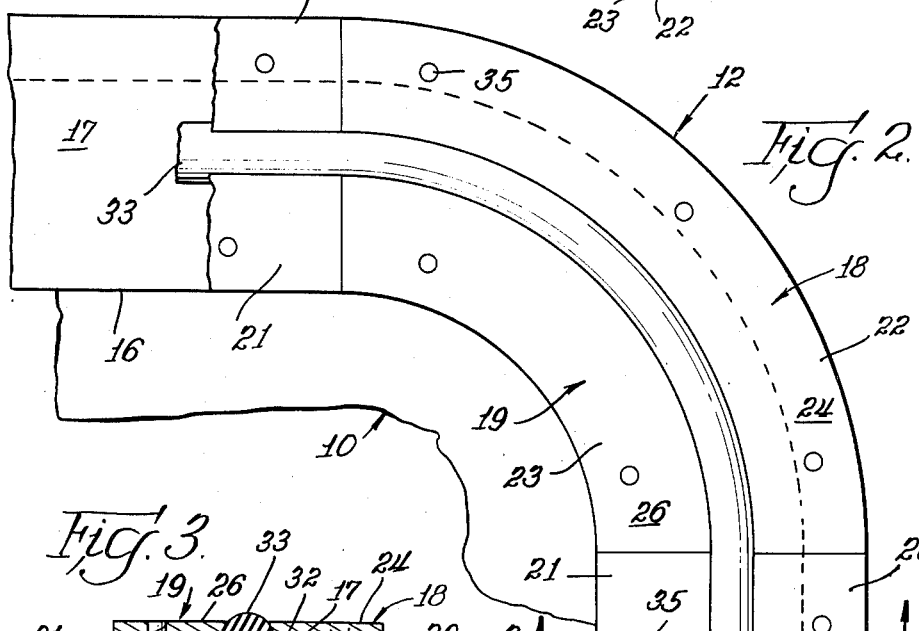
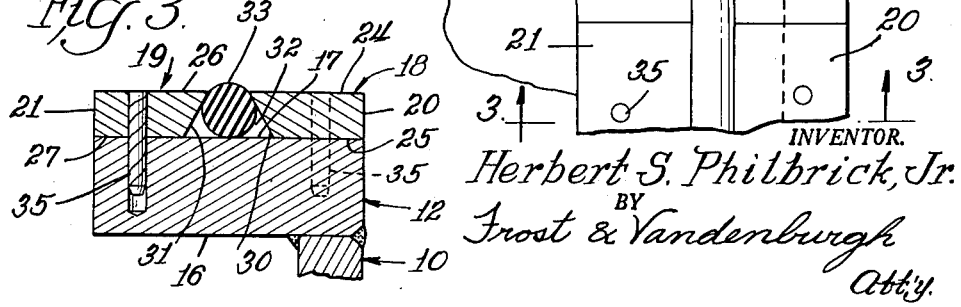
INVENTOR.
Herbert S. Philbrick, Jr.
BY Frost & Vandenburgh
Att'y.

3,077,010
GAS STERILIZER APPARATUS
Herbert S. Philbrick, Jr., Evanston, Ill., assignor to John Mohr & Sons, Chicago, Ill., a corporation of Illinois
Filed Aug. 4, 1960, Ser. No. 47,409
2 Claims. (Cl. 20—11)

The present invention relates to an article of manufacture and a method of forming that article used to obtain a fluid-tight seal about the door of a gas sterilizing unit, a fumigating chamber or the like.

Many hospitals and other organizations use a gas such as ethylene oxide (usually mixed with an inert gas) for sterilizing surgical instruments, equipment, clothing, bed linen, blankets, etc. These articles are put in a sterilizing chamber, a door closed and the desired sterilizing atmosphere or atmospheres created within the chamber. It is necessary that a tight seal be obtained about the door to prevent the fluid applied to the inside of the chamber from leaking about the door into the area surrounding the chamber where people are working. The problem of maintaining a seal usually is complicated by large pressure differentials between the interior of the chamber and the exterior thereof. Substantially the same problems exist with respect to fumigating chamber and other devices of a similar nature.

With such devices, the frame against which the door abuts and the frame of the door itself must be extremely sturdy so as not to deflect or bend when clamping pressures are applied to securely hold the frame of the door against the frame that defines the door opening. Furthermore, provision must be made for one or the other, or both, to hold a gasket so as to obtain the desired fluid seal between the two. This gasket must be mounted in such a way so as to prevent its being pushed sideways out from between the space between the door frame and the door opening frame.

The present method for forming the frame member which holds the gasket is to cut a plurality of members, solid in cross-section, which when assembled end-to-end will define the frame. Before assembly, a longitudinal groove is cut in each of these members with the groove being of a shape to receive and hold a door gasket. The gaskets generally used are triangular in cross-section, and the groove cut to hold them is in the shape of a truncated triangle as viewed in cross-section.

After the members have been cut to the desired size and positioned end-to-end, they are welded together to form the desired frame. The problem with this process is that it is extremely difficult to have all portions of the finished frame lie in common planes. For example, the outer face of the frame is likely not to define an exact plane, nor is the base of the truncated groove for receiving the gasket likely to be in a common plane. This difficulty not only arises from the problem of positioning and holding the parts in the desired exact relationship to each other when the welding takes place, but it also is due to the fact that the welding produces stresses in the material which act to warp the frame after the welding has been completed. Some portions of such a frame might be re-machined after it is made, but certain portions, e.g. the groove, would be nearly impossible to re-machine and it would be extremely expensive to endeavor to do so.

Because of the foregoing problem, it is the general practice to use gaskets which stand out a substantial distance from the frame so that despite the irregularities in the frame a firm sealing contact can be obtained between the gasket of the one frame holding the gasket and the frame against which the gasket abuts. However, because of the fact that the frame holding the gasket is not planar, the outstanding edge or face of the gasket will not lie in a plane and portions of it will be mashed substantially more than others each time that the door is closed and clamped shut. These excessively deformed portions of the gasket will deteriorate rapidly, necessitating constant replacement of the gasket.

The principal object of the present invention is to provide a simple and inexpensive method for making such a frame member for holding a gasket and to provide a frame member produced simply and inexpensively, yet which is planar in configuration. My invention will not only produce a frame member as simply and inexpensively as the prior art practices, but because it is assured of being planar, it may be designed to employ a gasket which need not project nearly as far from the outer face of the frame member as is the practice in the prior art procedures. Thus, the gaskets are not deformed to any such extent as previously occurred, and the gasket life will be greatly increased.

In the method of my invention, a generally rectangular frame body first is formed. This body may be formed by welding together a plurality of bars of metal, or it might be formed by cutting the body from a metal slab. The dimensions of the body, of course, are determined by the size of the door opening and door. In addition, it is made with cross-sectional dimensions such that it will be substantially rigid. Assuming that it is the frame about the door opening that is to hold the gasket, the face of this body that will be positioned in juxtaposition to the door is then cut to a plane. This may be done simply and easily by cutting the face in a planing machine, or planer, until it is planar. This face is cut so as to have four straight sides which are joined at the corners by four semi-circular segments, i.e. the segments have outer and inner edges, each of which is a quarter of a circle.

Strips are cut to define an outer and inner ridge, spaced from each other, and extending completely around the periphery of said face. One side of each of these strips abuts said face and the opposite side is cut so as to be parallel thereto. Thus, since the side of the strips abutting said face necessarily lies in a plane determined by said face, the opposite sides of said strips likewise will all be in a common plane. The distance between said sides of the strips should be substantially smaller than the thickness of the body as measured in the same direction so that the strips will conform to the shape of the body rather than vice versa. The strips should be less than one-half as thick as the corresponding dimension of the body.

The strips are cut with one of the edges between said sides being beveled, and when the strips are mounted on the body this beveled edge is placed in juxtaposition to the corresponding edge of the adjacent strip. Furthermore, the bevel is angled so that after the strips are mounted, the two strips define a space therebetween, which space when viewed in cross-section appears to be a truncated triangle with the base thereof at the face of the body member and the narrow dimension of the truncated triangle in the plane of the outer sides of the strips. A circular gasket is placed in this space, and the shape of the space between the strips enables the gasket to be deformed when the door is closed in a manner which will not result in rapid deterioration of the gasket. The narrow dimension of the truncated triangular space between the strips, i.e. the dimension between the strips in the plane of the outer sides thereof, should be smaller than the diameter of the gasket. The wider dimension of that truncated triangular should be wider than the diameter of the gasket.

Each of the two continuous strips is formed of four straight sections and four quarter-circular sections. The corner quarter-circle sections of the strips are most easily formed by turning a circular piece to the desired cross-sectional configuration on a lathe. After the material has been shaped on a lathe, it is cut into quarters with one of the quarters being used as a section at each corner of the body. Of course, two pieces will be turned on the lathe, one of which, when cut into quarters, will form sections of the inner strip and the other of which, when cut into quarters, will form sections of the outer strip. Straight sections of the strips for positioning between the corners can be cut on a planer.

After the strips are cut, they are affixed to the plane face of the body, and a gasket positioned between the outer and inner strips.

The following description of a specific embodiment of my invention is for the purpose of complying with 35 U.S.C. 112 and should not be construed as imposing unnecessary limitations upon the appended claims. Further objects and advantages of my invention will be apparent from the following description taken in conjunction with the drawings, in which:

FIGURE 1 is a perspective view of a portion of a gas sterilizing chamber having a frame defining the door opening constructed in accordance with my invention;

FIGURE 2 is an enlarged view of a section of the door frame of FIGURE 1; and

FIGURE 3 is a section taken at line 3—3 of FIGURE 2.

FIGURE 1 illustrates a cabinet generally 10 which might be used in a gas sterilizing apparatus or the like. It defines an inner chamber 11 within which the articles to be sterilized are placed. Such chambers vary substantially in size, some having a chamber capacity of only a few cubic feet, others with a very substantial height, width and depth have a chamber capacity of many cubic feet.

About the end of the cabinet 10 is a door frame generally 12 which defines a door opening which is co-extensive with chamber 11. A door 13 is mounted on hinges 14 so that it can be swung against and away from door frame 12. A suitable locking device (not shown) is provided to clamp the door 13 tight against frame 12 so that a fluid seal may be maintained therebetween. In this embodiment, it is the frame 12 about the door opening that is produced in accordance with my invention and which holds the sealing gasket. In other embodiments, it might be the frame 15 of the door 13 that was so manufactured.

Frame 12 includes a body 16 constructed to form one piece as previously disclosed. After body 16 is formed, the outer face 17 is cut so that all portions thereof lie in a common plane. A continuous outer strip generally 18 and a continuous inner strip generally 19, spaced from each other, are affixed to body 16. Each of the strips 18 and 19 are formed of four straight sections 20 and 21, respectively. In many embodiments these straight sections may be identical to each other as they are originally formed. In addition, strip 18 includes four corner sections 22 and strip 19 includes four corner sections 23. Straight sections 20 and 21 all may be formed on a planer. Sections 22 and 23 are formed by turning circular members on a lathe to the desired cross-sectional configuration and then cutting those members into quarters.

Each of the sections that makes up strip 18 has a pair of parallel sides 24 and 25. Similarly, the sections that make up strip 19 have a pair of sides 26 and 27. Sides 24 and 26 are parallel to sides 25 and 27, respectively, with each pair of sides being spaced the same distance apart. The thickness of the sections, i.e. the distance between the pairs of sides 24 and 25 and 26 and 27 should be substantially less than the thickness of body 16 as measured in the same direction.

The sections that form outer strip 18 have a beveled edge 30, while the sections that form strip 19 have a beveled edge 31. When the strips are positioned along face 17, the beveled edges 30 and 31 are aligned to form a truncated, triangular space 32 between the two strips 18 and 19. Within this space 32 is positioned a resilient gasket 33. Gasket 33 is continuous in length and circular in cross-section, as viewed in FIGURE 3. It may be formed of a natural rubber, a synthetic rubber, or the like.

The sections that make up strips 18 and 19 preferably are affixed to body 16 by a plurality of pins 35. In the illustrated embodiment, these pins have ridges thereabout that will frictionally engage the sides of the drilled hole into which they are driven. Self-locking spring pins also may be similarly used. To mount the strips 18 and 19, the sections that form the strip are clamped in place. Holes are then drilled through the strip and into the body 16. Thereafter, the pins 35 are driven into the holes to frictionally engage both the strip and the body. Other methods of fastening the strips to the body might be employed. For example, the strips might be bonded to the body by an adhesive. However, in any such alternate process care should be taken that sides 25 and 27 of the strips are fixed in position parallel to face 17 of body 16.

The diameter of gasket 33 as viewed in FIGURE 3 is slightly greater than the thickness of strips 18 and 19 as measured normal to face 17. This will insure a good contact between the gasket and the door 13 when the door is closed. Since the truncated, triangular shape of space 32 provides space about gasket 33 between the strips, the pressure of the door on the gasket causes the gasket to change its cross-sectional configuration within that space. This permits a mild form of deformation of the cross-sectional configuration of the gasket as compared with what occurs if a gasket is fixed in a holder having the exact configuration as that of the cross-section of the gasket. This results in substantially increased life from a gasket and replacement is not as often required as is the case with respect to the prior art structures.

I claim:
1. The method of making a seal assembly for a door and door frame comprising the steps of: forming a planar face on the door such that all surface points on said face lie in substantially the same plane; machining a planar face on a frame body such that when said frame body is mounted to the door frame the machined surface points of the face will lie in substantially the same plane; mounting said frame body to the door frame; machining parallel top and bottom faces on a plurality of straight longitudinal strips, each surface point on each of said top and bottom faces, respectively, lying in substantially the same plane; machining beveled edge portions on one of the edges between said top and bottom faces of each of said strips, respectively; mounting said longitudinal strips in paired, juxtaposed relation about the perimeter of the frame body with a plurality of pins, the ends of said strips being in spaced relation to the corner portions of the frame body, said strips being mounted to the frame body with one planar face against said frame body, the paired strips being mounted with their beveled edges facing each other in mutually spaced relation such that the transverse cross section of said space between the beveled edges is of truncated triangular configuration with the wider portion of said configuration being immediately adjacent the planar face of said frame body; forming a pair of corner members for each corner of the door frame body member, said corner members being formed such that the top and bottom faces thereof are in mutual parallel relation with each of the surface points on each of the top and bottom faces, respectively, lying in substantially the same plane; forming a beveled edge portion on the smallest linearly measured edge of each of the outer corner members of each pair of members for each corner; forming a beveled edge portion of the longest linearly measured edge of each of the inner corner members of each pair of members for each corner; mounting the formed pairs of corner members to the portions of the frame body defined between the terminals of the straight longitudinal strips so as to define a continuous inner and outer strip about the entire perimeter of the frame body; placing a sealing gasket, generally round in cross-section, within the spaced interval defined between the straight strips and corner portions of sufficient diameter to protrude slightly beyond the upper face of the straight strips and corner portions a uniform distance about the entire perimeter of the frame body.

2. A seal assembly for a cabinet comprising: a cabinet body open at one side, the perimeter of said cabinet body opening defining a generally rectangular outline having rounded corners and a planar face; a frame body having machined parallel top and bottom faces, said frame body being rigidly mounted to the perimeter about the open side of the cabinet body with the bottom planar face adjacent the cabinet body, the surface points on each of the parallel faces, respectively, of said frame body lying substantially in the same plane; a pair of straight longitudinal strips affixed to the top planar face of said frame body along each of the straight portions of the perimeter, said pair of strips defining an inner and an outer strip, said strips terminating at either end at the initiation of the rounded corner portions of the perimeter, each of said strips defining parallel top and bottom faces with the surface points of each parallel top and bottom face, respectively, lying substantially in the same plane, one edge of said strips being beveled, said strips being mounted on said frame body in mutually spaced relation with the beveled edges facing each other such that the transverse cross section of said space defined between the beveled edges and said pair of strips is of truncated triangular configurations with the wider portion of said configuration being defined immediately adjacent the top planar face of the frame body and the narrower portion being defined between the top planar faces of said spaced pair of strips, respectively; a pair of curved strips affixed to the top planar face of the frame body in each of the areas thereof defining the rounded corner portions of the perimeter, each of said pair of strips defining an inner and an outer strip, each of said strips defining parallel top and bottom faces with the surface points of each top and bottom face, respectively, lying in a common plane, said inner and outer strip of each pair of curved strips terminating at either end, respectively, in abutting relation to the mating inner and outer longitudinal strips, respectively, to thereby define a continuous inner and outer band about the perimeter, the inwardly facing edge of each strip of each pair of strips being beveled, said inner and outer curved strips on each corner portion being mounted to said frame body in mutually spaced relation with the beveled edges facing each other such that the transverse cross section of said space between the beveled edges is of truncated triangular configuration along a curvilinear path with the wider portion of said configuration being defined immediately adjacent the top planar face of the frame body and the narrower portion defined between the top planar faces of the inner and outer curved strips, respectively, the space configuration defined between said curved pairs of strips being in mating continuous relation to the spaced configuration defined between said pairs of longitudinal strips to thereby define a continuous truncated triangular configuration about the entire perimeter; a sealing gasket positioned in the continuously defined truncated triangular configuration, said sealing gasket having a major dimension greater than the dimension of the narrower portion of said configuration and smaller than the dimensions of the wider portion of said configuration, a portion of said sealing gasket in its static position adapted to project outwardly of the top planar faces of the straight and curved strips through the narrower portion of the space configuration, said spaced configuration being larger in volume than the volume of the portion of said sealing gasket confined totally within the outline of said configuration when said gasket is in its static position; and a cabinet door pivotally mounted to said cabinet body, said door defining a perimeter thereon, said perimeter being in mating overlying relation to said cabinet perimeter when said door is pivoted against the cabinet perimeter, the door perimeter having a machined planar face, the sealing gasket, when said door is pivoted closed against the cabinet opening, adapted to be engaged by the planar face of said door perimeter and to be deflected by said face to a dynamic position wherein it is urged inwardly of the space configuration, said gasket thereby defining a fluid tight seal between the door perimeter and the cabinet opening.

References Cited in the file of this patent

UNITED STATES PATENTS

| | | |
|---|---|---|
| 234,895 | Thompson | Nov. 30, 1880 |
| 821,353 | Funk | May 22, 1906 |
| 866,439 | De Canio | Sept. 17, 1907 |
| 1,494,579 | Bohn | May 20, 1924 |
| 2,172,458 | Shuart | Sept. 12, 1939 |
| 2,778,072 | Palisca | Jan. 22, 1957 |

FOREIGN PATENTS

| | | |
|---|---|---|
| 753,641 | Great Britain | July 25, 1956 |
| 1,227,340 | France | Mar. 7, 1960 |